United States Patent
Lin

(10) Patent No.: US 11,132,321 B2
(45) Date of Patent: Sep. 28, 2021

(54) METHOD AND SYSTEM FOR AUTOMATIC BIFURCATION OF PCIE IN BIOS

(71) Applicant: Quanta Computer Inc., Taoyuan (TW)

(72) Inventor: Yu-Han Lin, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 0 days.

(21) Appl. No.: 16/802,161

(22) Filed: Feb. 26, 2020

(65) Prior Publication Data

US 2021/0263875 A1    Aug. 26, 2021

(51) Int. Cl.
| | |
|---|---|
| G06F 13/40 | (2006.01) |
| G06F 9/4401 | (2018.01) |
| G06F 13/38 | (2006.01) |
| G06F 13/42 | (2006.01) |

(52) U.S. Cl.
CPC ........ G06F 13/4045 (2013.01); G06F 9/4411 (2013.01); G06F 13/385 (2013.01); G06F 13/4221 (2013.01); *G06F 2213/0026* (2013.01)

(58) Field of Classification Search
CPC ............... G06F 13/4045; G06F 13/385; G06F 13/4221; G06F 9/4411; G06F 2213/0026
See application file for complete search history.

(56) References Cited

U.S. PATENT DOCUMENTS

| | | | |
|---|---|---|---|
| 8,751,714 B2 | 6/2014 | Safranek et al. | |
| 10,120,809 B2 | 11/2018 | Arellano et al. | |
| 10,191,877 B2 | 1/2019 | Harriman et al. | |
| 10,474,612 B1* | 11/2019 | Guevara | G06F 13/4027 |
| 10,756,816 B1* | 8/2020 | Dreier | G06F 3/0659 |
| 2015/0301964 A1* | 10/2015 | Brinicombe | G06F 3/061 |
| | | | 710/308 |
| 2018/0246833 A1 | 8/2018 | Bai et al. | |
| 2018/0260125 A1* | 9/2018 | Botes | G06F 3/067 |
| 2018/0341497 A1* | 11/2018 | Perez Guevara | G06F 9/4403 |
| 2019/0340148 A1 | 11/2019 | Tan et al. | |

FOREIGN PATENT DOCUMENTS

| | | |
|---|---|---|
| CN | 104391816 B | 11/2018 |
| CN | 110442446 A | 11/2019 |
| JP | 6150886 B2 | 6/2017 |
| TW | 201732620 A | 9/2017 |

OTHER PUBLICATIONS

TW Office Action for Application No. 109136057, dated Aug. 19, 2021, w/ First Office Action Summary.
TW Search Report for Application No. 109136057, dated Aug. 19, 2021, w/ First Office Action.

* cited by examiner

*Primary Examiner* — Henry Tsai
*Assistant Examiner* — John B Roche
(74) *Attorney, Agent, or Firm* — Nixon Peabody LLP

(57) ABSTRACT

A system and method for automatically generating a control bifurcation signal to configure ports of a PCIe IO unit on a computing device. The lanes of the PCIe IO unit are divided into initial ports of the lowest granularity. It is determined whether a PCIe device is connected to each of the initial ports. The bifurcation port configuration of the PCIe IO unit is determined based on the initial ports having a connected PCIe device. Ports for the PCIe IO unit are configured based on the bifurcation port configuration.

19 Claims, 6 Drawing Sheets

FIG. 3A

| | Detect status (shaded means device detected on the port) | | | | PCIe bifurcation set | | | |
|---|---|---|---|---|---|---|---|---|
| | Port 2a | Port 2b | Port 2c | Port 2d | Port 2a | Port 2b | Port 2c | Port 2d |
| | | | | | x4 | x4 | x4 | x4 |
| 332 | ✓ | | | | x16 | | | |
| | | ✓ | | | x4 | x4 | x4 | x4 |
| | | | ✓ | | x4 | x4 | x8 | |
| | | | | ✓ | x4 | x4 | x4 | x4 |
| | ✓ | ✓ | | | x4 | x4 | x4 | x4 |
| 334 | ✓ | | ✓ | | x8 | | x8 | |
| 336 | ✓ | | | ✓ | x8 | | x4 | x4 |
| | | ✓ | ✓ | | x4 | x4 | x8 | |
| | | ✓ | | ✓ | x4 | x4 | x4 | x4 |
| | | | ✓ | ✓ | x4 | x4 | x4 | x4 |
| 338 | ✓ | ✓ | ✓ | | x4 | x4 | x8 | |
| 340 | ✓ | ✓ | | ✓ | x4 | x4 | x4 | x4 |
| | ✓ | | ✓ | ✓ | x8 | | x4 | x4 |
| | | ✓ | ✓ | ✓ | x4 | x4 | x4 | x4 |
| | ✓ | ✓ | ✓ | ✓ | x4 | x4 | x4 | x4 |

FIG. 3B

| | Detect status (shaded means device detected on the port) | | | | PCIe bifurcation set | | | |
|---|---|---|---|---|---|---|---|---|
| | Port 2a | Port 2b | Port 2c | Port 2d | Port 2a | Port 2b | Port 2c | Port 2d |
| | | | | | x4 | x4 | x4 | x4 |
| | ✓ | | | | x4 | x4 | x4 | x4 |
| | | ✓ | | | x8 | | x4 | x4 |
| | | | ✓ | | x4 | x4 | x4 | x4 |
| 380 | | | | ✓ | x16 | | | |
| | ✓ | ✓ | | | x4 | x4 | x4 | x4 |
| | ✓ | | ✓ | | x4 | x4 | x4 | x4 |
| | ✓ | | | ✓ | x4 | x4 | x8 | |
| | | ✓ | ✓ | | x8 | | x4 | x4 |
| 382 | | ✓ | | ✓ | x8 | | x8 | |
| | | | ✓ | ✓ | x4 | x4 | x4 | x4 |
| | ✓ | ✓ | ✓ | | x4 | x4 | x4 | x4 |
| | ✓ | ✓ | | ✓ | x4 | x4 | x8 | |
| 384 | ✓ | | ✓ | ✓ | x4 | x4 | x4 | x4 |
| 386 | | ✓ | ✓ | ✓ | x8 | | x4 | x4 |
| | ✓ | ✓ | ✓ | ✓ | x4 | x4 | x4 | x4 |

|  610 Detect status (shaded means device detected on the port) | | | | 620 PCIe bifurcation set | | | | 630 Which port(s) lost device detection | 640 PCIe bifurcation set in (cross-hatched means won't go to this step due to no device lost detected) | | | |
|---|---|---|---|---|---|---|---|---|---|---|---|---|
| Port 2a | Port 2b | Port 2c | Port 2d | Port 2a | Port 2b | Port 2c | Port 2d | | Port 2a | Port 2b | Port 2c | Port 2d |
| ▨ |  |  |  | x16 | | | | | ▨ | ▨ | ▨ | ▨ |
| ▨ |  |  |  | x16 | | | | Port 2a | x4 | x4 | x4 | x4 |
|  | ▨ |  |  | x8 | | x4 | x4 | | ▨ | ▨ | ▨ | ▨ |
|  | ▨ |  |  | x8 | | x4 | x4 | Port 2a | x4 | x4 | x4 | x4 |
|  |  | ▨ |  | x4 | x4 | x8 | | | ▨ | ▨ | ▨ | ▨ |
|  |  | ▨ |  | x4 | x4 | x8 | | Port 2c | x4 | x4 | x4 | x4 |
| ▨ | ▨ |  |  | x16 | | | | | ▨ | ▨ | ▨ | ▨ |
| ▨ | ▨ |  |  | x16 | | | | Port 2a | x4 | x4 | x4 | x4 |
| ▨ | ▨ |  |  | x4 | x4 | x4 | x4 | | ▨ | ▨ | ▨ | ▨ |
| ▨ |  | ▨ |  | x8 | | x8 | | | ▨ | ▨ | ▨ | ▨ |
| ▨ |  | ▨ |  | x8 | | x8 | | Port 2a | x4 | x4 | x8 | |
| ▨ |  | ▨ |  | x8 | | x8 | | Port 2c | x8 | | x4 | x4 |
| ▨ |  | ▨ |  | x8 | | x8 | | Port 2a/ 2c | x4 | x4 | x4 | x4 |
| ▨ |  |  | ▨ | x8 | | x8 | | | ▨ | ▨ | ▨ | ▨ |
| ▨ |  |  | ▨ | x8 | | x8 | | Port 2a | x4 | x4 | x8 | |
| ▨ |  |  | ▨ | x8 | | x8 | | Port 2c | x8 | | x4 | x4 |
| ▨ |  |  | ▨ | x8 | | x8 | | Port 2a/ 2c | x4 | x4 | x4 | x4 |
|  | ▨ | ▨ |  | x8 | | x8 | | | ▨ | ▨ | ▨ | ▨ |
|  | ▨ | ▨ |  | x8 | | x8 | | Port 2a | x4 | x4 | x8 | |
|  | ▨ | ▨ |  | x8 | | x8 | | Port 2c | x8 | | x4 | x4 |
|  | ▨ | ▨ |  | x8 | | x8 | | Port 2a/ 2c | x4 | x4 | x4 | x4 |
|  | ▨ |  | ▨ | x8 | | x8 | | | ▨ | ▨ | ▨ | ▨ |
|  | ▨ |  | ▨ | x8 | | x8 | | Port 2a | x4 | x4 | x8 | |
|  | ▨ |  | ▨ | x8 | | x8 | | Port 2c | x8 | | x4 | x4 |
|  | ▨ |  | ▨ | x8 | | x8 | | Port 2a/ 2c | x4 | x4 | x4 | x4 |
|  |  | ▨ | ▨ | x4 | x4 | x4 | x4 | | ▨ | ▨ | ▨ | ▨ |
|  |  | ▨ | ▨ | x4 | x4 | x8 | | | ▨ | ▨ | ▨ | ▨ |
|  |  | ▨ | ▨ | x4 | x4 | x8 | | Port 2c | x4 | x4 | x4 | x4 |
| ▨ | ▨ | ▨ |  | x4 | x4 | x8 | | | ▨ | ▨ | ▨ | ▨ |
| ▨ | ▨ | ▨ |  | x4 | x4 | x8 | | Port 2c | x4 | x4 | x4 | x4 |
| ▨ | ▨ |  | ▨ | x8 | | x4 | x4 | | ▨ | ▨ | ▨ | ▨ |
| ▨ | ▨ |  | ▨ | x8 | | x4 | x4 | Port 2a | x4 | x4 | x4 | x4 |
| ▨ |  | ▨ | ▨ | x8 | | x4 | x4 | | ▨ | ▨ | ▨ | ▨ |
| ▨ |  | ▨ | ▨ | x8 | | x4 | x4 | Port 2a | x4 | x4 | x4 | x4 |
| ▨ | ▨ | ▨ | ▨ | x4 | x4 | x4 | x4 | | ▨ | ▨ | ▨ | ▨ |

FIG. 6

METHOD AND SYSTEM FOR AUTOMATIC BIFURCATION OF PCIE IN BIOS

TECHNICAL FIELD

The present disclosure relates generally to dynamic bifurcation control for PCIe devices in computing systems. More particularly, aspects of this disclosure relate to a method to ensure efficient and automatic bifurcation control of PCIe input/output units by a BIOS.

BACKGROUND

The peripheral component interconnect express (PCIe) standard has been adopted for connection of high-speed components in computing devices. Devices have PCIe input/output (IO) units with multiple lanes to communicate data. Such IO units may include 4, 8, or 16 lanes that may be split into different communication channels for connection to different PCIe devices. A bifurcation control mechanism from a basic input output system (BIOS) allows splitting a bus IO unit, such as a PCI Express bus IO unit into smaller buses, for different PCIe devices. For example, a 16-lane PCIe Gen 3 bus IO unit may be split into two x8-lane width PCIe Gen 3 interfaces through a bifurcation setting to the device. Processors in servers supporting PCIe bifurcation have a BIOS setting for enabling the bifurcation feature for their respective PCIe IO unit.

According to the PCIe specification, bifurcation provides flexibility for devices with PCIe IO units to match the lane width of connectors for communicating with the components of the system they are installed on. A wider lane width requires more actual hardware connection pins but provides higher communication speed. In a computer system with PCIe device support capability, PCIe root ports are usually provided by the CPU or chipset for connection to PCIe devices. The CPU/chipset vendor usually provides a flexible method to allow a computer system designer to configure PCIe lane bifurcation dynamically as the CPU/chipset has a fixed number of pins for PCIe communication. For example, a group of 16 PCIe lanes supported by the CPU may be able to be configured as one x16 lane width PCIe port to support one PCIe device, two x8 width PCIe ports to support two PCIe devices, one x8 and two x4 width PCIe ports to support three PCIe devices, or four x4 width PCIe ports to support four PCIe devices.

A wider width (e.g., one x16 width port) provides higher communication speed with a PCIe device but reduces the total number of supported PCIe devices of the system. In contrast, a narrower width (e.g., four x4 width ports) provides lower speed but more ports for PCIe devices to be connected. Such flexibility in the number of lanes per port provides a computer system designer the ability to provide different systems supporting different numbers and types of PCIe devices with the same CPU/chipset. It is common for a computer system manufacturer to use a single BIOS firmware image to support these different computer systems. The single BIOS image needs to store each PCIe bifurcation configuration used for each system to suit the hardware design associated with each system. The usual method is to provide a mapping table in the BIOS to correlate the PCIe bifurcation configurations with different systems supported by the CPU/chipset.

When the BIOS is powered on, the system type is detected and the BIOS can set the correct PCIe bifurcation in the CPU/chipset based on the table. However, if the BIOS sets the wrong bifurcation, the system may not be able to use some PCIe devices installed on the system, or some PCIe devices may run with degraded speed.

The system design in a server system is usually complicated. A CPU/chipset may have many groups of PCIe lanes, and each group can have an individual bifurcation setting. It is a challenge to identify different systems that require different bifurcation configurations. For example, two systems may have the same motherboard with different PCIe riser cards. Riser cards are an extension board which can be installed on the motherboard to route PCIe signals from the motherboard to the PCIe cards installed on the riser card. Thus, different PCIe riser cards may need different PCIe bifurcation configurations. For example, a first riser card may route all 16 PCIe lanes to a single x16 width PCIe slot while a second riser card may route the 16 PCIe lanes to two x8 width PCIe slots. The BIOS needs to know which PCIe riser card is installed to provide the correct PCIe bifurcation setting. To complicate things further, a third system may have a totally different motherboard. In this example, the BIOS may need different methods to identify the three systems for setting the PCIe bifurcations correctly.

Such complexity sometimes causes a BIOS designer to write the wrong PCIe bifurcation setting for some systems. Also, when the PCIe design for a system is changed or a new system supported by the same BIOS is added, releasing a new BIOS version is required to support such PCIe bifurcation design changes. These potential changes increase the maintenance difficulty of the systems and the BIOS itself.

FIG. 1 is a block diagram of a prior art vendor CPU design 10 having a group of configurable PCIe IO units. The CPU design 10 includes a first IO unit 12 (port 0, DMI), a second IO unit 14 (port 1, IOU2), a third IO unit 16 (port 2, IOU0), and a fourth IO unit 18 (port 3, IOU1). Each of the IO units 12, 14, 16, and 18 have different potential configurations of the pins of the IO units for respective PCIe lanes. Each of the set of IO units, such as the IO unit 14, has a transaction layer 20, a link layer 22, and a physical layer with a set of physical lanes 24. The physical lanes are pins that may be mated with corresponding PCIe connectors, which are used to install PCIe cards. Depending on the system design, instead of being mated with PCIe connectors, these pins may also be connected to PCIe devices directly without PCIe connectors. In this example, the IO unit 14 has physical lanes 0~7 and may be configured for one or two ports (ports 1a and 1b). The IO units 16 and 18 have corresponding sets of physical lanes 34 and 44 (lanes 0-15), and may be configured for up to four ports. Each port can be connected to a PCIe device, whether through PCIe connectors or with a direct connection.

For example, the IO unit (Port 2, IOU0) 16 has several different possible bifurcation settings and corresponding combinations of up to four ports (ports 2a, 2b, 2c, and 2d). The PCIe bifurcation may thus be set for four ports, each having x 4 width lanes—e.g. port 2a (×4), port 2b (×4), port 2c (×4), and port 2d (×4); three ports—two having ×4 width lanes, and one having ×8 width lanes (port 2a (×4), port 2b (×4), and port 2c (×8)); three ports—one having ×8 width lanes, and two having ×4 width lanes (port 2a (×8), port 2c (×4), port 2d (×4)); two ports, each having ×8 width lanes (port 2a (×8), port 2c (×8)); and one port with ×16 width lanes (port 2a (×16)).

The example vendor CPU design 10 provides the system designer flexibility to support different PCIe devices on different systems while using the CPU design 10. However, the PCIe bifurcation must be configured correctly for the CPU design 10. Otherwise, a connected PCIe device may not be able to be detected. For example, if a ×4 link width PCIe device is connected on physical links 4~7 of the IO unit 16 but the PCIe bifurcation control sets port 2a as a ×16 link width port without ports 2b, 2c, and 2d, then this PCIe device cannot be detected. This is because for a PCIe port, the first physical link or the latest physical link (in this case, link 0 or link 15 for port 2a, as it is configured as a ×16 width port) must be connected to the PCIe device for detection. To detect the first physical link of the PCIe device in this case, the PCIe bifurcation must be set to have port 2b as a ×4 width port or port 2a as a ×8 width port.

Another problem may be that a PCIe device may be detected by the PCIe root port but is run with a degraded link width, causing a possible performance drop of the PCIe device. For example, if a ×8 link width PCIe device is connected on physical links 0~7 of the IO unit 16, but the PCIe bifurcation control sets link 0~7 as port 2a with a ×4 link width and port 2b with a ×4 link width, the ×8 width PCIe device can communicate through port 2a but can only run with ×4 link width. To allow the PCIe device to run with a full link width (×8), the PCIe bifurcation control must set lanes 0~7 as port 2a (×8) or lanes 0~15 as port 2a (×16).

Currently, a BIOS will detect the system during power-on to set the correct PCIe bifurcation. The PCIe bifurcation is set according to a pre-defined table in the BIOS that describes the mapping from each system to its correct PCIe bifurcation setting. As explained above, the BIOS designer may write the wrong PCIe bifurcation setting for each system due to the complexity of system design. Also, when a PCIe design is changed for a system or a new system which uses the same BIOS is added, releasing a new BIOS version is required to support such PCIe bifurcation design changes. This increases the maintenance difficulty of the systems and the BIOS itself.

Thus, there is a need for a computing device that uses system firmware such as a BIOS, to recognize the correct PCIe bifurcation setting on an IO unit automatically. There is a further need to eliminate the need for maintaining a PCIe bifurcation table in BIOS for looking up configurations for each system. There is a further need for a procedure that allows a PCIe bifurcation setting to be changed while supported by the same BIOS, thus eliminating the need to release a new BIOS for new PCIe bifurcation requirements.

SUMMARY

One disclosed example is a system for with automatic bifurcation detection and configuration of a PCIe IO unit. The system has a computing device including a PCIe IO unit having configurable lanes. A PCIe device is connected to at least some of the lanes of the PCIe IO unit. The system includes a bifurcation configuration device operable to divide the lanes of the PCIe IO unit into a plurality of initial ports. Each of the initial ports has the lowest granularity of the lanes. The bifurcation configuration device detects whether the PCIe device is connected to each of the plurality of initial ports. The bifurcation configuration device determines a bifurcation port configuration for the PICe IO unit based on the detection of the PCIe devices connected to the initial ports. The bifurcation configuration device stores the bifurcation port configuration for the PCIe IO unit.

In another implementation of the disclosed example system, the configuration device is operable to merge an initial port without a detected PCIe device with another initial port. In another implementation, the configuration device includes a basic input output system (BIOS). In another implementation, the PCIe device is selected from the group consisting of a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch. In another implementation, the configuration device includes lane reversal rules for the lane connections between the PCIe IO unit and the PCIe device. The configuration device adjusts the bifurcation configuration for lane reversal. In another implementation, the PCIe IO unit has sixteen configurable lanes and there are four lowest granularity initial ports. In another implementation, the computing device is a CPU. In another implementation, the computing device includes multiple PCIe IO units. Each of the PCIe IO units is configured by the bifurcation configuration device. In another implementation, the configuration device reboots the system after configuring the PCIe IO unit. The configuration device then determines whether any previously detected PCIe devices are not detected. The configuration device then reconfigures the ports of the PCIe IO unit if any previously detected PCIe devices are not detected. In another implementation, the PCIe device is one of a plurality of PCIe devices connected to the lanes of the PCIe IO unit.

Another disclosed example is a method of automatically providing a bifurcation control signal to configure a PCIe IO unit on a computing device. The lanes of the PCIe IO unit are divided into a plurality of initial ports of the lowest granularity. A configuration device determines whether a PCIe device is connected to each of the plurality of initial ports. The bifurcation port configuration of the PCIe IO unit is determined based on the initial ports having a connected PCIe device via the configuration device. Ports for the PCIe IO unit are configured based on the bifurcation port configuration.

In another implementations of the disclosed example method, an initial port without a detected PCIe device is merged with another initial port. In another implementation, the configuration device includes a basic input output system (BIOS). In another implementation, the PCIe device is selected from the group consisting of a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch. In another implementation, the method includes determining lane reversal of the lane connections between the PCIe IO unit and the PCIe device. The method also includes adjusting the bifurcation configuration for lane reversal. In another implementation, the PCIe IO unit has sixteen configurable lanes and there are four lowest granularity initial ports. In another implementation, the computing device is a CPU. In another implementation, the computing device includes a plurality of PCIe IO units, and ports of each of the PCIe IO units are automatically configured by the bifurcation configuration device. In another implementation of the disclosed example method, the system is rebooted after configuring the PCIe IO unit. It is determined whether any previously detected PCIe devices are not detected. The ports of the PCIe IO unit are reconfigured if any previously detected PCIe devices are not detected.

Another disclosed example is a basic input output system firmware executable on a controller. The firmware includes instructions that divide the lanes of a PCIe IO unit into a plurality of initial ports of the lowest granularity. The firmware also includes instructions that detect whether a PCIe device is connected to each of the plurality of initial ports. The firmware also includes instructions that determine the bifurcation port configuration of the PCIe IO unit based on the initial ports having a connected PCIe device. The firmware includes instructions that configure ports of the PCIe IO unit based on the bifurcation port configuration.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 3A is an example table of the rules for detection of PCIe devices and merging of unconnected ports for the example system in FIG. 2, according to certain aspects of the present disclosure;

FIG. 3B is an example table of the rules for PCIe lane reversal for detection of PCIe devices and merging of unconnected ports for the example system in FIG. 2, according to certain aspects of the present disclosure;

FIG. 6 is a table of different rules for normal automatic configuration of a PCIe IO unit and configuration based on a detected lane reversal.

Figure 1:
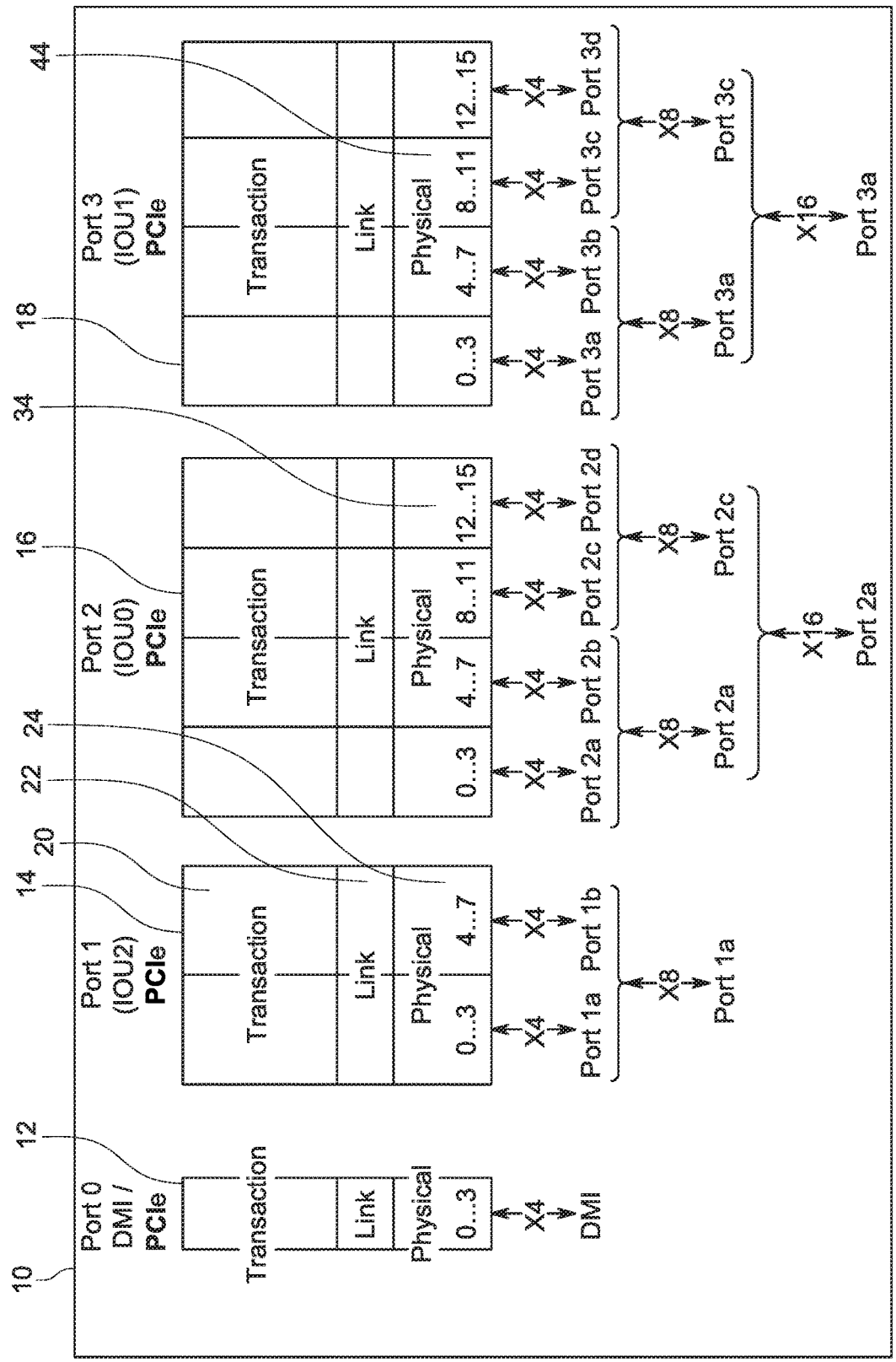
FIG. 1 is a block diagram of a prior art processor design with configurable PCIe IO units.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure provides a method to allow system firmware, such as a BIOS, to recognize the correct peripheral component interconnect (PCIe) bifurcation setting automatically for a PCIe input/output (IO) unit instead of relying on manually, pre-programmed, PCIe bifurcation configuration tables. With automatic configuration recognition, a BIOS does not need to maintain a PCIe bifurcation configuration table with entries for each system type. Further, when a new system is introduced where the PCIe bifurcation has changed, the same BIOS may support the new system and new bifurcation configuration. This eliminates the need to release a new BIOS for the new PCIe bifurcation requirement.

The disclosed method sets PCIe bifurcation to the smallest granularity ports by default for a given PCIe IO unit. For example, a 16 lane PCIe IO unit channel is set to four ×4 width initial ports. Any connected PCIe devices are detected for each of the smallest granularity ports. The PCIe bifurcation is set correctly according to the PCIe device detection status when set as the smallest granularity. The routine merges any PCIe initial ports of the lowest granularity where a PCIe device is not detected to their neighboring initial ports to insure correct lane utilization.

Figure 2:
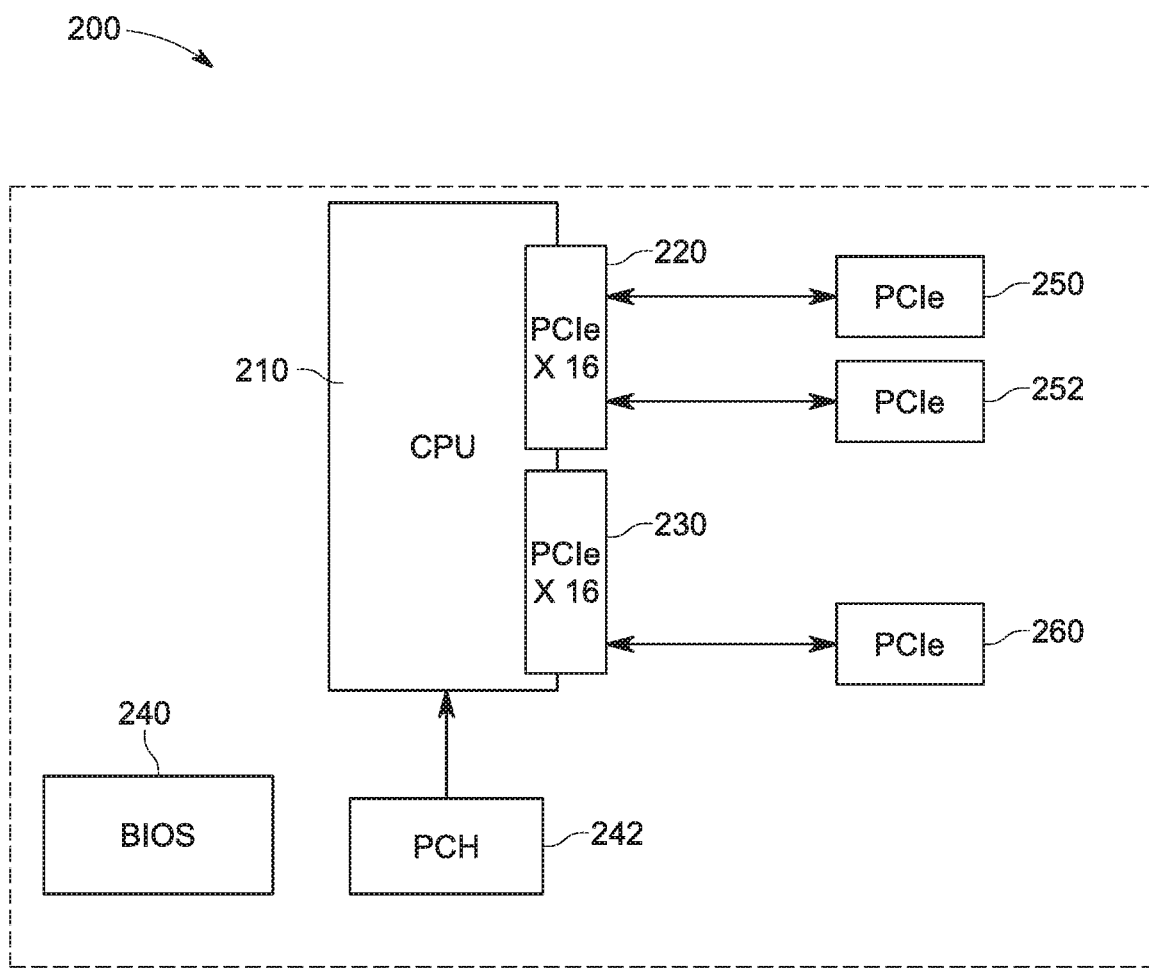
FIG. 2 is a block diagram of an example system that uses a BIOS to automatically detect the bifurcation configuration of PCIe IO units, according to certain aspects of the present disclosure.

FIG. 2 is a block diagram of an example system 200 that allows automatic detection of PCIe IO unit configuration. The example system 200 includes a computing device such as a CPU 210 with PCIe IO units 220 and 230. It is to be understood that the CPU 210 may include more than the two example PCIe IO units 220 and 230. The PCIe IO units 220 or 230 may be connected to riser cards that provide connectors to different types of PCIe devices.

Each of the PCIe IO units 220 and 230 may be configured for different lane configurations via a bifurcation control from a BIOS 240. Similar to the example port 16 in FIG. 1, each of the PCIe IO units 220 and 230 have a transaction layer, a link layer, and a physical layer with 16 physical lanes (0-15). The PCIe IO units 220 and 230 may each be configured for up to four separate ports. In this example, the PCIe IO unit 220 is connected to two PCIe devices 250 and 252. The PCIe devices 250 and 252 may be a network interface controller (NIC) cards, a non-volatile memory express (NVMe) device, a redundant array of independent disks (RAID) card, a host bus adapter (HBA) card, a video card, a sound card, a graphics processing unit (GPU) card, a field programmable gate array (FPGA) card, or a PCIe switch. The PCIe IO unit 220 therefore must be configured with the proper bifurcation control signal to allocate the correct lanes to the two PCIe devices 250 and 252. For example, physical lanes 0-7 of the PCIe IO unit 220 may be connected to the PCIe device 250, while physical lanes 8-15 may be connected to the PCIe device 252. In order to operate the PCIe devices 250 and 252 at maximum transmission, the PCIe IO unit 220 must be configured with two ports with ×8 width.

The proper bifurcation control setting to allocate the lanes to the PCIe devices 250 and 252 is determined automatically by the BIOS 240. As explained herein, different numbers of PCIe devices requiring different bifurcation control signals may be used with the example system 200 because such configurations are automatically detected by the BIOS 240. For example, a single PCIe device 260 is connected to the physical lanes of the PCIe IO unit 230, and therefore, the configuration for the PCIe IO unit 230 differs from the configuration of the PCIe IO unit 220.

Thus, the example bifurcation control setting routine of the BIOS 240 allows configuring the lanes of a PCIe IO unit into ports of different sizes. In this example, the bifurcation setting of the CPU 210 for PCIe IO unit configuration may be set by the BIOS 240 through a CPU configuration register during the power-on of the example system 200. Alternatively, the configuration may be set through a platform controller hub (PCH) 242.

In this example, the PCIe IO unit 220 may be configured to properly communicate with the PCIe devices 250 and 252 by the BIOS 240 in accordance with the principles described herein. After system power-on, the BIOS 240 is configured to set the bifurcation of the PCIe IO unit 220 to initial ports of the smallest granularity. In this example, the IO unit has 16 lanes, and the smallest granularity is thus four initial ports of 4 lanes—e.g., port 2a (×4), port 2b (×4), port 2c (×4), and port 2d (×4). The routine detects whether any PCIe devices are connected to any of the initial ports. Because the ports are the smallest granularity of bifurcation, all PCIe devices connected to the PCIe IO unit 220 that can be detected with correct PCIe bifurcation are also expected to be detected in this condition. In this example, the first port (2a, lanes 0-3) and the third port (2c, lanes 8-11) have PCIe devices 250 and 252 connected respectively. The routine then merges the initial ports with no PICe device detected to a neighboring initial port to make use of the additional free lanes. In this example, the two unconnected ports (2b and 2d) are merged with the other two ports (2a and 2c) with connected PCIe devices. The BIOS 240 then reboots the system and sets the PCIe bifurcation correctly according to the detection status from the previous detection process. In this example, the BIOS 240 correctly configures the PCIe IO unit 220 with two ×8 width links for the detected PCIe devices 250 and 252.

The BIOS routine for bifurcation detection and control is performed automatically according to rules that provide bifurcation configurations based on detected PCIe devices. One example of a rule used for the above example BIOS 240 may be if there is a PCIe device detected on port 2a, and if no devices are detected on ports 2b, 2c, and 2d, then the bifurcation configuration to port 2a is set to a ×16 width without ports 2b, 2c, and 2d. If no device is detected on port 2b, but a device is detected on ports 2c or 2d, then the bifurcation control for port 2a is set to ×8 width without a port 2b.

If a device is detected on port 2c, and if no device is detected on port 2d, then the bifurcation of port 2c is set with a ×8 width without a port 2d. Other examples of the rule may include if devices are detected on ports 2a and 2d, then the bifurcation is set as port 2a (×8 width), port 2c (×4 width) and port 2d (×4 width). In this example, if the PCIe device on port 2a is a ×8 link width device, it can now run with full link width (×8). Based on the rule, the device on port 2a is not a ×16 link width device because there is another device detected on port 2d (lanes 1215). The rule may also determine that the detected device on port 2d is also not a ×8 width link width device. Such a device should have been detected on port 2c and not port 2d in this case.

Another example is if devices are detected that are connected to ports 2a, 2c, and 2d, then the bifurcation is set as port 2a (×8), port 2c (×4) and port 2d (×4). This example is similar to the example above for the devices on port 2a and port 2d. The device on port 2c cannot be a ×8 link width device because there is another device connected to port 2d (lanes 12~15).

If devices are detected on port 2a and port 2c, then the bifurcation is set as port 2a (×8) and port 2c (×8). If the PCIe device on port 2a is a ×8 link width device, it can now run with full link width (×8). The device on port 2a is not a ×16 link width device because there is another device on port 2c (lanes 8~11). Thus, if the PCIe device on port 2c is a ×8 link width device, it can now run with full link width (×8).

If only one device is detected on port 2a, the bifurcation is set as a single port 2a (×16). Whether the PCIe device on port 2a is a ×8 link or ×16 link width device, it can now run with full link width.

FIG. 3A is a table 300 that shows the different permutations of the rule for detection and merging ports. A first set of columns 310 shows each of the lowest granularity ports of the PCIe IO unit 220. In this example, there are four columns 310 that represent each of the ports of the lowest granularity. Shaded entries under each of the ports in the columns 310 represent that a device is detected connected to the port. A second set of columns 320 represents the configuration for each of the ports of the lowest granularity, based on the corresponding detected devices. In the above explained example, if only the first port has a detected device (e.g., row 332), the ports are merged into a single ×16 width port. As explained above, when no device is detected on port 2b, but a device is detected on port 2c alone, then the ports are set to two 8× width ports as seen in a row 334. When devices are detected on ports 2a and 2d, then port 2a is set to 8× width while the port 2c and port 2d are each set to ×4 width as seen in row 336. When devices are detected on ports 2a, 2b and 2c, then the ports are configured to two ×4 width ports and one ×4 port as seen in a row 338. When devices are detected on ports 2a, 2b, and 2d, then the ports are configured to four ×4 width ports as seen in a row 340.

One alternative case requiring a different rule that that described above may be PCIe lane reversal. PCIe lane reversal is a situation where the PCIe connection between the lanes of the PCIe IO unit and the PCIe device is in reversed order. Thus, in a normal case, the PCIe IO unit lanes 0~15 ordinarily connect to PCIe device lanes 0~15. In a lane reversal case, the PCIe IO unit lanes 0~15 connect to PCIe device lanes 15~0 respectively.

If the above cases are under PCIe lane reversal situation, then the bifurcation setting is different. In the case of a PCIe lane reversal rule, if a device on port 2b detected, but no device is detected on port 2a, then the bifurcation of port 2a is set to ×8 width without port 2b. If a device on port 2d is detected, and no devices are detected on ports 2a, 2b, or 2c, then the bifurcation control is set to port 2a with a ×16 width without ports 2b, 2c, and 2d. If no device is detected on port 2c, but a device is detected on port 2a or port 2b, then the bifurcation to port 2c is set with a ×8 width without port 2d.

If devices are detected on ports 2a and 2d, the bifurcation is set as port 2a (×4), port 2b (×4), and port 2c (×8). The PCIe device on port 2a is only a ×4 link width or below. In a lane reversal situation, the first PCIe lane of the device must be connected on lane 3 to be detected by port 2a. Hence the PCIe device can only be a ×4 width (connected to port 2a lanes 3~0), a ×2 width (connected to port 2a lanes 3~2), or a ×1 width (connected to port 2a lane 3). Thus, configuring the port 2a as a ×4 width port is acceptable for this device.

The maximum possible link width of the device detected on port 2d is a ×8 width because no device is detected on port 2c (lanes 11~8), but there is a device detected on port 2a (lanes 3~0). Thus, the detected device may be a ×8 width (connected to lanes 15~8), a ×4 width (connected to lanes 15~12), a ×2 width (connected to lanes 15~14), or a ×1 width (connected to lane 15). Thus, the port 2c is configured as a ×8 width port to cover all these possibilities.

If devices are detected on ports 2a, 2c, and 2d, bifurcation is set as port 2a (×4), port 2b (×4), port 2c (×4) and port 2d (×4). Lanes 7~0 cannot be set as a single port 2a (×8) in a lane reversal situation because a device is detected connected to port 2a. This indicates that lane 0 of the PCIe device is connected to lane 3 of the PCIe IO unit. Setting lanes 7~0 as a single port will cause the PCIe device to not be detected due to lane 0 of the device not being connected to IO unit lane 7 or lane 0. The maximum physical link connection with the IO unit is a ×4 link width. Therefore, setting port 2a as ×4 link width will not limit the link width connection.

If devices are detected on ports 2a and 2c, the bifurcation is set as port 2a (×4), port 2b (×4), port 2c (×4) and port 2d (×4). In lane reversal, ports 2a and 2c are kept as ×4 width links because these ports can only be ×4 link width. If only one device detected on port 2a, the bifurcation will still set port 2a (×4) port 2b (×4), port 2c (×4) and port 2d (×4) for the same reason.

FIG. 3B is a table 350 that shows the lane reversal rules for configuring the bifurcating of ports depending on detected devices. A first set of columns 360 shows each of the lowest granularity ports of the PCIe IO unit 220 (in FIG. 2) in the lane reversal case. In this example, there are four columns 360 that represent each of the ports of the lowest granularity. Shaded entries under each of the ports in the columns 360 represent that a device is detected on the port. A second set of columns 370 represents the final configuration for each of the ports based on the corresponding detected devices.

As explained above, the lane reversal case results in different port configurations that differ from the normal configurations shown in FIG. 3A. In the table 350, a row 380 represents the ×16 single port configuration (2a) if a device is only detected on port 2d. A row 382 represents two ×8 width port configurations if devices are detected on ports 2b and 2d. A row 384 represents four ×4 width ports, when devices are detected on ports 2a, 2c and 2d. Similarly, a row 386 represents one ×8 width ports and two ×4 width ports, when devices are detected on ports 2b, 2c and 2d.

Figure 4:
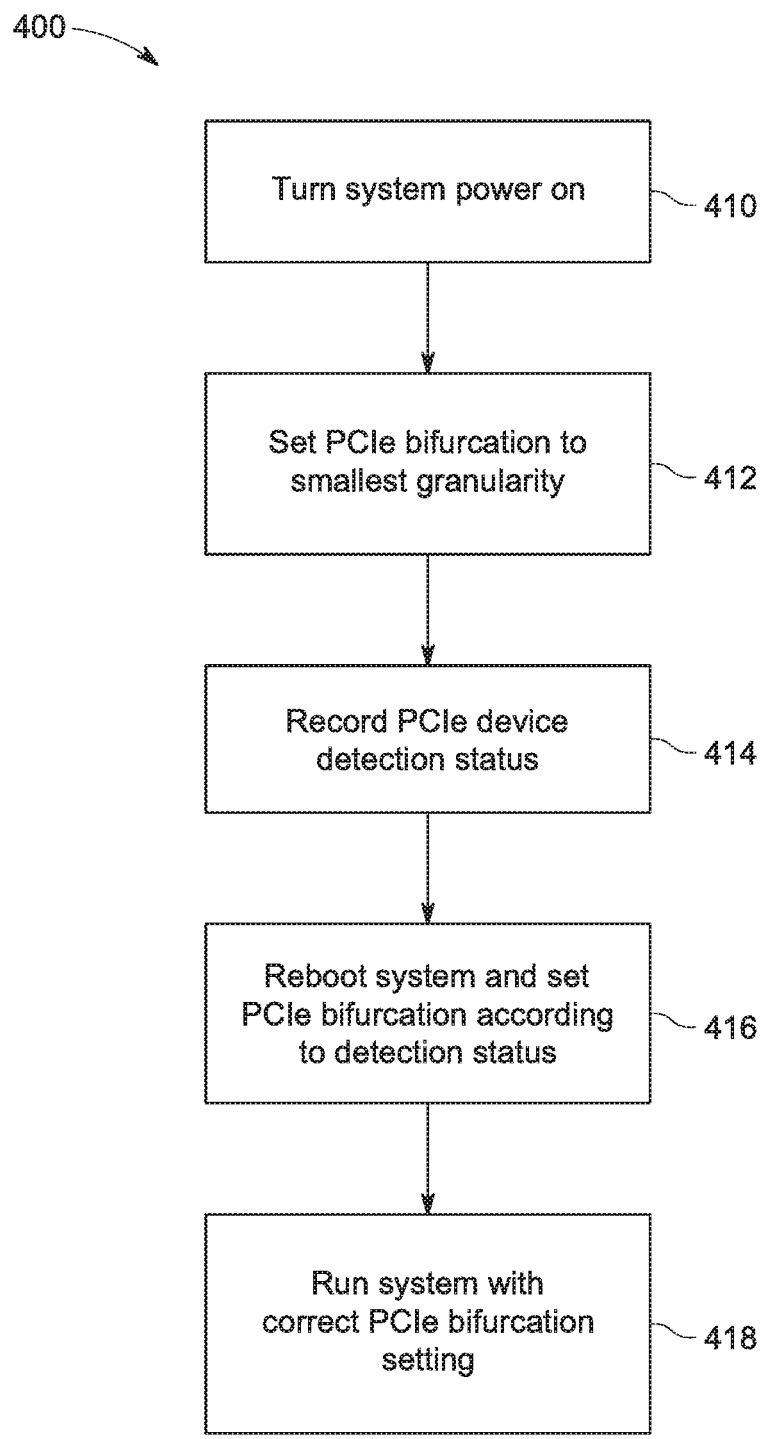
FIG. 4 is a flow diagram of a routine executed by the BIOS to automatically detect and configure the bifurcation confirmation of PCIe IO units in FIG. 2, according to certain aspects of the present disclosure.
Figure 5:
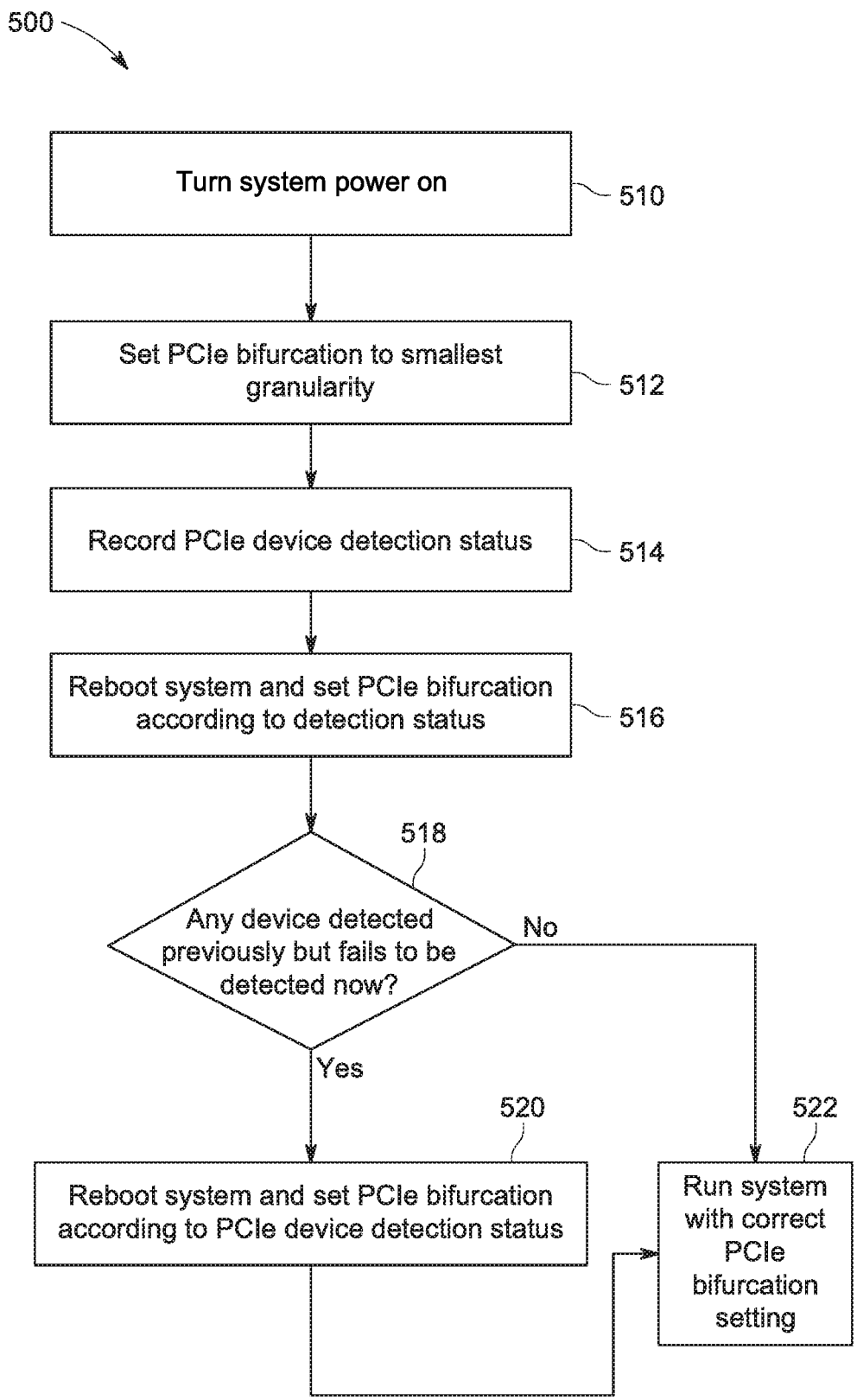
FIG. 5 is a flow diagram of a routine that provides an alternative bifurcation control method to account for PCIe lane reversal status that is unknown to the BIOS, according to certain aspects of the present disclosure.

The flow diagrams in FIG. 4-5 are representative of example machine readable instructions for the process of dynamic bifurcation configuration of a PCIe IO unit on a device such as a CPU. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC]; a programmable logic device [PLD]; a field programmable logic device [FPLD]; a field programmable gate array [FPGA]; discrete logic; etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 4-5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 4 is a flow diagram 400 of the process of automatic configuration of one of the example PCIe IO units 220 or 230 in FIG. 2 assuming lane reversal design is predefined. The system is powered on (410). The routine sets the bifurcation of the PCIe lanes of the PCIe IO unit 220 to initial ports of the smallest granularity (412). The system firmware then detects and records any PCIe device connected to any of the initial ports under the smallest granularity (414). In this example, the PCIe IO unit 220 has four ports (2a, 2b, 2c, and 2d) in the smallest granularity of bifurcation. Because the ports are the smallest granularity of bifurcation, all PCIe devices connected to the PCIe IO unit 220 which can be detected with correct PCIe bifurcation are also expected to be detected in this condition. Under the bifurcation at the smallest granularity, connected devices may not run with their full link width. For example, a PCIe device having eight lanes can only run with four lanes because of the smallest granularity of the four ports of four lanes each by the routine at this stage.

In order to provide a full link width for the larger width devices, the routine then merges the initial ports where no PCIe device is detected into a neighboring initial port having a connected PCIe device. This process thus makes use of the additional free PCIe lanes if required. The routine then reboots the system and sets the PCIe bifurcation of the ports of the PCIe IO unit 220, according to the status determined during detection (416). The system is then run with the corrected PCIe bifurcation settings that recognize all the connected PCIe devices and allocates the correct lane width to each device based on the detected status (418).

In the above described routine 400, the PCIe lane reversal design needs to be predefined so the correct rule can be used in the merger of the ports. Thus, another routine 500 in FIG. 5 allows the PCIe bifurcation to be automatically set correctly by the BIOS firmware even without information of the PCIe lane reversal configuration in the system.

In the routine 500, the system is powered-on (510). The routine sets the bifurcation of the PCIe lanes of a IO unit such as the PCIe IO unit 220 in FIG. 2 to initial ports of the smallest granularity (512). The system firmware then detects and records any PCIe device connected to any of the initial ports under the smallest granularity (514). In this example, the PCIe IO unit 220 has four initial ports (ports 2a, 2b, 2c, and 2d) in the smallest granularity of bifurcation. Because the ports are smallest granularity of bifurcation, all PCIe devices connected to the PCIe IO unit 220 that can be detected with correct PCIe bifurcation are also expected to be detected in this condition. Under the bifurcation at the smallest granularity, connected devices may not run with their full link width, and the detection does not take into account lane reversal.

In order to provide a full link width for the larger width devices, the routine then merges the initial ports which have no PCIe device connected, to neighboring initial ports having a connected PCIe device. This process makes use of the additional free PCIe lanes if required. The routine then reboots the system and sets the PCIe bifurcation of the ports of the PCIe IO unit 220 according to the status determined during detection (516). The routine then checks whether previously detected devices are still detected with the new configuration (518). If all devices previously detected are still detected, then the system is then run with the corrected PCIe bifurcation settings that recognize all the connected PCIe devices and allocates the correct lane width to each device based on the detected status (522).

If any device is not detected that was previously detected (518), this indicates either a case where no lane reversal is assumed but there is actually a lane reversal situation, or a case where lane reversal is assume but actually there is a no lane reversal situation. In this situation, the system firmware reboots the system again and splits the merged PCIe ports which lost the detection of the PCIe device (520). The system is then run with the corrected PCIe bifurcation settings that recognize all the connected PCIe devices and allocates the correct lane width to each device based on the detected status (522).

The possibility of the differences of lane reversal design between the assumption and the real situation leads to the possibility that some connected PCIe devices may be undetected after the initial bifurcation configuration is applied in the routine in FIG. 5. For example, if only one device detected on port 2a but no device is detected connected to ports 2b, 2c, and 2d, then the rule based on the assumption of no lane reversal will set bifurcation as a single port (2a) with ×16 link width. However, if the system includes lane reversal, the PCIe device will not be detected after the bifurcation configuration sets port 2a with a ×16 link width (lane 0~15) because lane 0 of the PCIe device is actually connected to IO unit lane 3, not lane 0 or lane 15. In this situation, the routine will return to reboot the system and change the bifurcation configuration to set back to port 2a (×4), port 2b (×4), port 2c (×4), and port 2d (×4) based on the rule for lane reversal, as summarized by the table 350 in FIG. 3B. Thus, the modified routine 500 rule for lane reversal will roll back the changes made by the normal rule if any device detected on the corresponding port is not detected with the configuration under the normal rule.

FIG. 6 shows a table 600 that shows all of the possibilities of device detection and failure to detect devices after a new configuration. The table 600 therefore includes comprehensive rules that cover both normal and lane reversal cases in the routine 500 in FIG. 5. The table 600 includes a first set of columns 610 that shows different possibilities for initial detection of PCIe devices to the lowest granularity ports represented by shaded entries. A second column 620 shows the corresponding initial bifurcation configuration settings of each of the corresponding ports for each of the detected ports. A third column 630 shows devices connected to ports that may not be detected after the initial bifurcation configuration is set according to column 620 for each of the detected ports in the columns 610. A fourth column 640 shows the modified bifurcation configuration settings based on the lack of detection of a previously detected device on a port or ports. The cross hatched entries in the columns 640 represent situations where the initial detected devices match the subsequent detected devices.

The advantages of the above approach allow a BIOS to recognize the correct PCIe bifurcation setting automatically for a PCIe IO unit of a device. This eliminates the need of the BIOS to rely on a PCIe bifurcation configuration table for each system. The procedure allows a PCIe bifurcation setting to be changed while using the BIOS thus eliminating the need to release a new BIOS for new PCIe bifurcation requirements.

As used in this application, the terms "component," "module," "system," or the like generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for automatic bifurcation detection and configuration of a peripheral component interconnect (PCIe) input/output (IO) unit, the system comprising:
   a computing device including a PCIe IO unit having a plurality of configurable lanes;
   a PCIe device connected to at least some of the lanes of the PCIe IO unit; and
   a bifurcation configuration device operable to:
      divide the lanes of the PCIe IO unit into a plurality of initial ports, each of the initial ports having the lowest granularity of the lanes,
      detect which of the plurality of initial ports the PCIe device is connected to,
      detect which of the ports of the plurality of initial ports that are unused;

determine a bifurcation port configuration for the PCIe IO unit based on a rule correlating one of a plurality of bifurcation port configurations with which of the plurality of initial ports have the PCIe device connected and which of the plurality of initial ports are unused; and store the bifurcation port configuration for the PCIe IO unit.

2. The system of claim 1, wherein the configuration device is operable to merge an initial port without a detected PCIe device with another initial port.

3. The system of claim 1, wherein the configuration device includes a basic input output system (BIOS).

4. The system of claim 1, wherein the PCIe device is selected from the group consisting of a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch.

5. The system of claim 1, wherein the configuration device includes lane reversal rules for the lane connections between the PCIe IO unit and the PCIe device, and wherein the configuration device adjusts the bifurcation configuration for lane reversal.

6. The system of claim 1, wherein the PCIe IO unit has sixteen configurable lanes and there are four lowest granularity initial ports.

7. The system of claim 1, wherein the computing device is a central processing unit (CPU).

8. The system of claim 7, wherein the computing device includes a plurality of PCIe IO units, and each of the PCIe IO units is configured by the bifurcation configuration device.

9. The system of claim 1, wherein the configuration device is further operable to:
reboot the system after configuring the PCIe IO unit;
determine whether any previously detected PCIe devices are not detected; and
reconfigure the ports of the PCIe IO unit if any previously detected PCIe devices are not detected.

10. The system of claim 1, wherein the PCIe device is one of a plurality of PCIe devices connected to the lanes of the PCIe IO unit.

11. A method of automatically providing a bifurcation control signal to configure a peripheral component interconnect (PCIe) input/output (IO) unit on a computing device, the method comprising:
dividing the lanes of the PCIe IO unit into a plurality of initial ports of the lowest granularity;
detecting whether a PCIe device is connected to each of the plurality of initial ports via the configuration device;
determining the bifurcation port configuration of the PCIe IO unit based on a rule correlating one of a plurality of bifurcation port configurations with which of the plurality of initial ports have the PCIe device connected and which of the plurality of initial ports are unused via the configuration device; and
configuring ports for the PCIe IO unit based on the bifurcation port configuration.

12. The method of claim 11, further comprising merging an initial port without a detected PCIe device with another initial port.

13. The method of claim 11, wherein the configuration device includes a basic input output system (BIOS).

14. The method of claim 11, further comprising:
determining lane reversal of the lane connections between the PCIe IO unit and the PCIe device; and
adjusting the bifurcation configuration for lane reversal.

15. The method of claim 11, wherein the PCIe IO unit has sixteen configurable lanes, and there are four lowest granularity initial ports.

16. The method of claim 12, wherein the computing device is a central processing unit (CPU).

17. The method of claim 16, wherein the computing device includes a plurality of PCIe IO units, and ports of each of the PCIe IO units are configured by the configuration device.

18. The method of claim 11, further comprising:
rebooting the system after configuring the PCIe IO unit;
determining whether any previously detected PCIe devices are not detected; and
reconfiguring the ports of the PCIe IO unit if any previously detected PCIe devices are not detected.

19. A basic input output system firmware executable on a controller, the firmware including instructions that:
divide the lanes of a peripheral component interconnect (PCIe) input/output (IO) unit into a plurality of initial ports of the lowest granularity;
detect whether a PCIe device is connected to each of the plurality of initial ports;
determine the bifurcation port configuration of the PCIe IO unit based on a rule correlating one of a plurality of bifurcation port configurations with which of the plurality of initial ports have the PCIe device connected and which of the plurality of initial ports are unused; and
configure ports of the PCIe IO unit based on the bifurcation port configuration.

* * * * *